US012544952B2

(12) United States Patent

Lee et al.

(10) Patent No.: US 12,544,952 B2

(45) Date of Patent: Feb. 10, 2026

(54) CUTTING APPARATUS HAVING ADJUSTABLE DIRECTION

(71) Applicant: EGUN CO., LTD., Gwangju-si (KR)

(72) Inventors: Sung Jun Lee, Gwangju-si (KR); Chae Mun Lee, Seongnam-si (KR)

(73) Assignee: EGUN Co. Ltd., Gwangju-si (KR)

( * ) Notice: Subject to any disclaimer, the term of this patent is extended or adjusted under 35 U.S.C. 154(b) by 289 days.

(21) Appl. No.: 18/016,395

(22) PCT Filed: Jul. 13, 2021

(86) PCT No.: PCT/KR2021/009005
§ 371 (c)(1),
(2) Date: Jan. 16, 2023

(87) PCT Pub. No.: WO2022/015035
PCT Pub. Date: Jan. 20, 2022

(65) Prior Publication Data

US 2023/0321870 A1 Oct. 12, 2023

(30) Foreign Application Priority Data

Jul. 17, 2020 (KR) ........................ 10-2020-0088944

(51) Int. Cl.
*B28D 1/04* (2006.01)
*B28D 1/24* (2006.01)
*B28D 7/00* (2006.01)

(52) U.S. Cl.
CPC ............. *B28D 1/045* (2013.01); *B28D 1/042* (2013.01); *B28D 1/24* (2013.01); *B28D 7/005* (2013.01)

(58) Field of Classification Search
CPC . B28D 1/02; B28D 1/04; B28D 1/042; B28D 1/044; B28D 1/045; B28D 1/24; E01C 23/09; E01C 23/0933

(Continued)

(56) References Cited

U.S. PATENT DOCUMENTS 4,552,122 A * 11/1985 Kelly ..................... B28D 1/003 125/14
4,583,908 A 4/1986 Crawford (Continued)

FOREIGN PATENT DOCUMENTS

| | | |
|---|---|---|
| EP | 1637655 | 3/2006 |
| JP | 4030915 | 1/2008 |

(Continued)

OTHER PUBLICATIONS

KR-20100003106-U machine translation, Mar. 18, 2010 (Year: 2010).*

(Continued)

*Primary Examiner* — Brian D Keller
*Assistant Examiner* — Marcel T Dion
(74) *Attorney, Agent, or Firm* — Fish IP Law, LLP; Tomas A. Prieto

(57) ABSTRACT

A cutting apparatus having adjustable direction, according to the present invention, can comprise: a cutting frame; a cutting shaft disposed at the front of the cutting frame and a cutting blade fitted into the cutting shaft, when the proceeding direction of the cutting apparatus is the front and the opposite direction thereof is the rear; a direction-adjusting unit positioned below the cutting frame at the rear of the cutting frame so as to be connected to the cutting frame and adjust the cutting shaft so that same can rotate; and an intermediate frame for supporting the direction-adjusting unit.

6 Claims, 8 Drawing Sheets

(58) Field of Classification Search
USPC ........................................................ 125/13.01
See application file for complete search history.

(56) References Cited

U.S. PATENT DOCUMENTS

| | | | | | |
|---|---|---|---|---|---|
| 4,832,412 | A * | 5/1989 | Bertrand | B28D 1/045 30/379 |
| 5,689,072 | A * | 11/1997 | Chiuminatta | B28D 1/045 73/862.541 |
| 6,425,638 | B1 * | 7/2002 | Kodama | B28D 1/045 404/83 |
| 8,931,853 | B1 * | 1/2015 | Taylor, Jr. | B28D 1/044 299/72 |
| 2016/0332330 | A1 * | 11/2016 | Carlsson | B28D 7/005 |

FOREIGN PATENT DOCUMENTS

| | | | | |
|---|---|---|---|---|
| KR | 100938760 | | 1/2010 | |
| KR | 20100003106 | U * | 3/2010 | B28D 1/041 |
| KR | 101877962 | | 7/2018 | |
| KR | 10-2018-0104892 | | 9/2018 | |
| KR | 20180104892 | | 9/2018 | |
| KR | 20180104892 | A * | 9/2018 | E01C 23/127 |
| KR | 10-2004246 | | 10/2019 | |

OTHER PUBLICATIONS

Lee, KR-20180104892-A machine translation, Sep. 27, 2018 (Year: 2018).*

* cited by examiner (a)

(b)

(c)

CUTTING APPARATUS HAVING ADJUSTABLE DIRECTION

TECHNICAL FIELD

The present invention relates to a cutting machine, and more particularly to a cutting machine having adjustable directions.

BACKGROUND ART

If a cutting machine does not precisely cut concrete, etc. along a predetermined cutting line, cutting performance is greatly deteriorated. Consequently, it is very important for the cutting machine to perform cutting while accurately moving along the cutting line.

A cutting machine configured to cut concrete, etc. must not quickly move but must slowly move to such an extent that the cutting machine does not move 20 cm or more per minute. The reason for this is that it takes time to cut concrete, etc. and moreover the movement speed of the cutting machine must not be high for precise cutting.

In general, a conventional cutting machine is moved by a hydraulic motor. When driving force of the hydraulic motor is directly transmitted to wheels, however, the cutting machine is quickly moved, and therefore precise control becomes difficult.

There may be the case in which a cutting shaft and a cutting blade of the cutting machine are located at each of opposite sides of a cutting frame, and therefore the cutting blades are rotated and driven at opposite sides of the front of the cutting machine, and the case in which the cutting shaft and the cutting blade of the cutting machine are located at one side (e.g. the right side) of the cutting frame, and therefore the cutting blades are rotated and driven at one side of the front of the cutting machine.

When the cutting machine cuts concrete, etc. while slowly moving along the cutting line (e.g. a straight line), the cutting blade is rotated at one side (e.g. the right side) of the cutting frame, whereby the force of friction between the floor and the cutting blade at the right side of the cutting frame, and therefore the cutting machine cannot accurately move along the cutting line.

If the cutting machine performs cutting while not accurately moving along the predetermined cutting line, as described above, cutting performance may be greatly deteriorated. The present invention provides various measures to solve the above problems.

DISCLOSURE

Technical Problem

It is an object of the present invention to provide a cutting machine having adjustable directions.

Technical Solution

The characteristic constructions of the present invention to achieve the above object of the present invention and to realize the characteristic effects of the present invention, which will be described below, are as follows.

A cutting machine having adjustable directions according to the present invention includes a cutting frame, a cutting shaft disposed in front of the cutting frame and a cutting blade fitted on the cutting shaft assuming that the direction in which the cutting machine is advanced is a forward direction and the direction opposite thereto is a rearward direction, and a direction adjustment unit located under the cutting frame at the rear of the cutting frame, the direction adjustment unit being connected to the cutting frame, the direction adjustment unit being configured to adjust the cutting shaft so as to be rotatable.

The direction adjustment unit may be configured to be adjusted so as to correspond to a direction and an angle necessary for the rotation set based on the position of the cutting shaft and the size of the cutting blade.

The direction adjustment unit may include an upper plate, a lower plate, a first direction adjustment fastening portion located at a left side of the rear of the upper plate, and a second direction adjustment fastening portion located at a right side of the rear of the upper plate, a fixing fastening portion may be located at each of opposite side surfaces of each of the upper plate and the lower plate, a center fastening portion may be located in each of the upper plate and the lower plate by insertion, the center fastening portion being configured to serve as a rotary shaft, and the direction adjustment unit may control movement of the upper plate using the first and second direction adjustment fastening portions, thereby controlling rotation of the cutting shaft.

The direction adjustment unit may be configured such that, when the cutting shaft is located at a right side of the front of the cutting machine, the second direction adjustment fastening portion is fastened such that a right side surface of the upper plate cannot be moved rearwards, a first insertion hole located at a left side surface of the upper plate is moved rearwards, and a second insertion hole located at the right side surface of the upper plate is moved forwards, whereby the cutting shaft is rotated in a counterclockwise direction.

The direction adjustment unit may be configured such that, when the cutting shaft is located at a left side of the front of the cutting machine, the first direction adjustment fastening portion is fastened such that a left side surface of the upper plate cannot be moved rearwards, a first insertion hole located at the left side surface of the upper plate is moved forwards, and a second insertion hole located at a right side surface of the upper plate is moved rearwards, whereby the cutting shaft is rotated in a clockwise direction.

Each of insertion holes of the upper plate, into which the fixing fastening portions are respectively inserted, may be constituted by a space extending in a longitudinal direction by a predetermined length, and the insertion holes of the upper plate may be moved forwards and rearwards around the fixing fastening portions to control rotation of the cutting shaft.

The fixing fastening portion may include a fixing bolt, and each of the first and second direction adjustment fastening portions may include an adjustment screw.

The cutting machine may further include a first power motor disposed at one side of the cutting machine, a first power wheel configured to be driven by the first power motor, a first reducer configured to connect the first power motor and the first power wheel to each other therebetween, a second power motor disposed at the other side of the cutting machine, a second power wheel configured to be driven by the second power motor, and a second reducer configured to connect the second power motor and the second power wheel to each other therebetween, wherein the first reducer and the second reducer may be provided such that the cutting shaft can be moved forwards while maintaining a set direction during cutting.

Advantageous Effects

The present invention has the following effects.

In an embodiment of the present invention, when cutting is performed after a cutting frame is rotated in a predetermined direction and at a predetermined angle and is then fixed, control may be performed such that a cutting machine can be precisely moved along a predetermined cutting line.

In an embodiment of the present invention, a reducer is connected to a hydraulic motor of the cutting machine, whereby it is possible to more precisely control movement of the cutting machine than when cutting is performed after the cutting frame is rotated and is then fixed.

In addition, the present invention has an effect in that a vertical reducer is further included, whereby the miniaturized state of the cutting machine is maintained without increasing the width of the cutting machine.

In addition, the present invention has an effect in that the cutting machine is stably moved through the structure of a track unit including a power wheel.

BEST MODE

Figure 1:
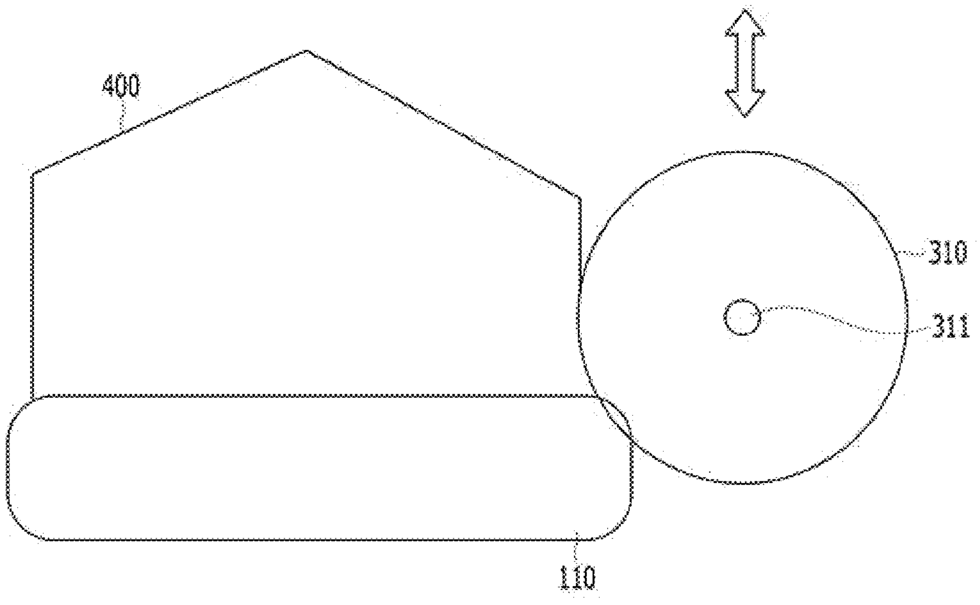
FIG. 1 is a view showing the external shape of a cutting machine according to an embodiment of the present invention.

The following detailed description of the present invention will be given with reference to the accompanying drawings showing specific embodiments, based on which the present invention can be implemented, by way of example. These embodiments will be described in detail to such an extent that those skilled in the art can implement the present invention. It should be understood that various embodiments of the present invention are different from each other but do not have to be mutually exclusive. For example, specific shapes, structures, and features of one embodiment described herein can be implemented as another embodiment without departing the spirit and scope of the present invention. In addition, it should be understood that the position or disposition of individual elements in each disclosed embodiment can be changed without departing from the spirit and scope of the present invention. Consequently, the following detailed description is not restrictive, and the scope of the present invention is defined only by the appended claims and all equivalents thereto, if appropriately described. In the drawings, similar reference numerals denote the same or similar functions in several aspects.

Hereinafter, preferred embodiments of the present invention will be described in detail with reference to the accompanying drawings such that those skilled in the art to which the present invention pertains can easily implement the present invention.

FIG. 1 is a view showing the external shape of a cutting machine according to an embodiment of the present invention.

The cutting machine according to the present invention may cut a hard floor, a wall, etc. made of concrete, etc. At this time, the cutting machine according to the present invention may be more stably and precisely controlled.

First, as can be seen from FIG. 1 showing the external appearance of the cutting machine, the cutting machine may include a main unit 400, a track unit 110, and a cutting blade 310, wherein the cutting blade 310 may be moved upwards and downwards. The cutting machine may be moved through the track unit 110, and the cutting blade 310 may be moved upwards and downwards to cut concrete, etc. Hereinafter, the structure of the cutting machine will be described in more detail. In the following description, it is assumed that the direction in which the cutting machine is advanced is a forward direction and the direction opposite thereto is a rearward direction for convenience of description. That is, the side on which the cutting blade 310 is located may be expressed as the front, and the side opposite thereto may be expressed as the rear.

Figure 2:
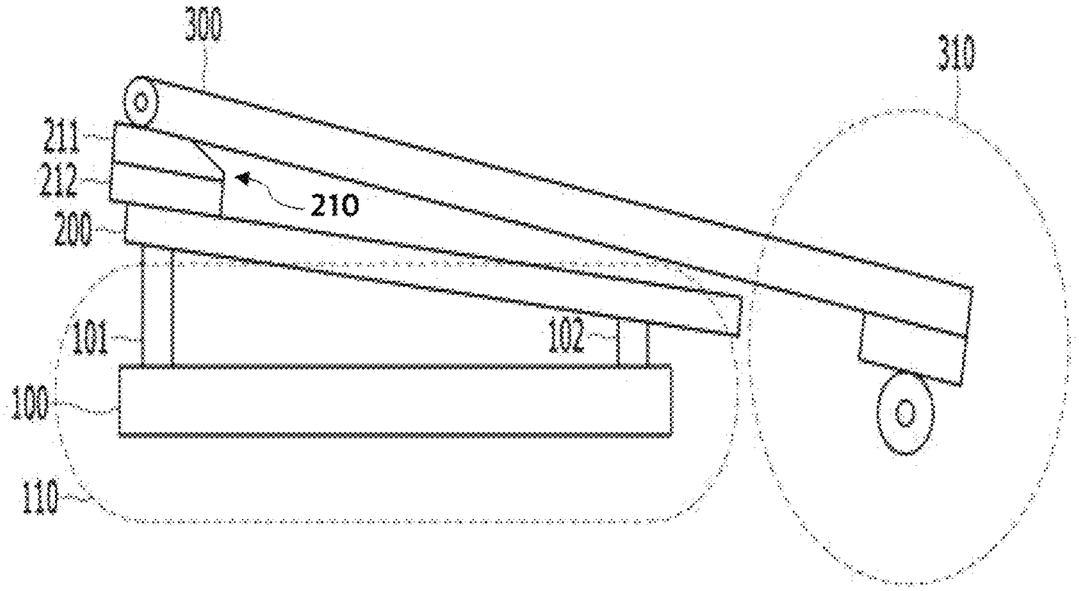
FIG. 2 is a view showing a frame structure of the cutting machine according to the embodiment of the present invention.

FIG. 2 is a view showing a frame structure of the cutting machine according to the embodiment of the present invention.

As can be seen from FIG. 2, the cutting machine may include a cutting frame 300, a middle frame 200 (any of various frame names, such as a main frame, may be used, and the "middle frame" is used in the present application), and a track frame 100, which are sequentially disposed from above. These frames may be considered essential frames.

Specifically, in the cutting machine according to the present invention, a cutting shaft 311 may be located at a front end of the cutting frame 300, and the cutting blade 300 may be fitted onto the cutting shaft 311. The cutting blade 300 may be fitted onto each side of the cutting shaft 300, or the cutting blade 311 may be fitted onto only one side (the left side or the right side) of the cutting shaft. The cutting blade 311 is rotatable and may have a gear shape or a circular shape.

The middle frame 200 may be located under the cutting frame 300, and the middle frame 200 may support the cutting frame 300. As shown in FIG. 2, the middle frame 200 is inclined, which will be described below.

The track frame 100 may be located under the middle frame 200, and each side of the track frame 100 may be connected to the track unit 110. The track frame 100 is the lowest component of the frame structure, and therefore, the track frame is located lower than the cutting frame 300.

Figure 3:
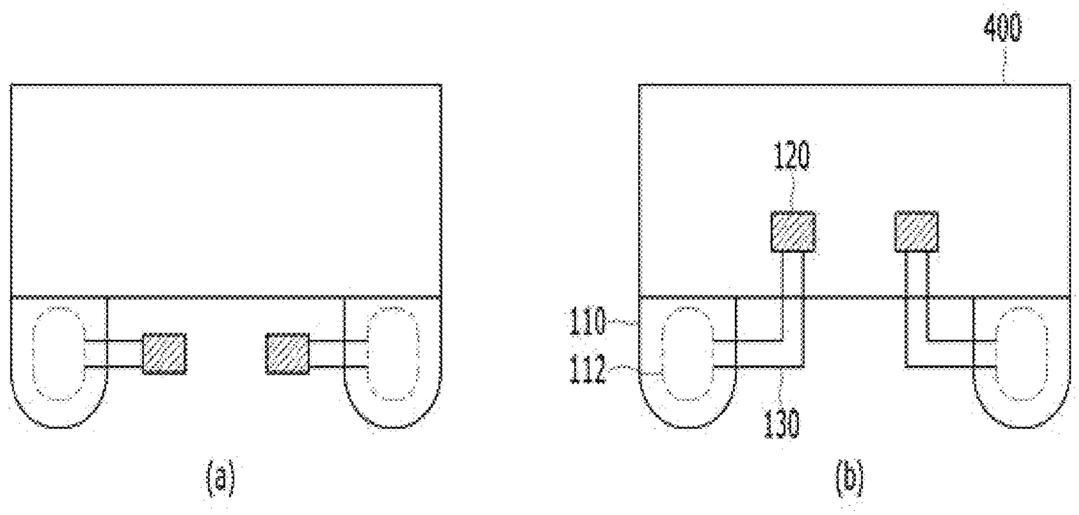
FIG. 3 is a view showing a hydraulic motor installed in the cutting machine according to the embodiment of the present invention.

FIG. 3 is a view showing a power motor (e.g. a hydraulic motor or an electric motor) installed in the cutting machine according to the embodiment of the present invention.

(a) of FIG. 3 shows the state in which the power motor (which will hereinafter be described as a "hydraulic motor" for convenience of description) and a power wheel are directly connected to each other, and (b) of FIG. 3 shows the state in which a vertical reducer is interposed between the hydraulic motor and the power wheel.

The track unit 110 may include a plurality of wheels, among which the power wheel 112 may receive driving force generated by a hydraulic motor 120. For example, when the hydraulic motor 120 makes one revolution in the state in which the diameter of the power wheel 112 is about 15 cm, the power wheel 112 also makes one revolution. In this case, the cutting machine is moved about 50 cm (3.14×15).

However, the cutting machine must be very slowly moved, since the cutting machine cuts iron reinforcing bars or concrete. In many cases, the cutting machine must not be moved 20 cm or more per minute. Consequently, when the hydraulic motor 120 and the power wheel 112 are directly connected to each other, as described above, accuracy and safety of the cutting machine may be lowered. Furthermore, an actual hydraulic motor 120 must make at least 15 to 20 revolutions per minute in order to generated meaningful power. When the hydraulic motor and the power wheel are directly connected to each other, as shown in (a) of FIG. 3, a problem may occur.

In order to solve the above problem, two hydraulic motors 120 and two power wheels 112 are connected respectively to each other via two reducers 130, which will be described with reference to (b) of FIG. 3.

Each of two track units 110 connected to opposite sides of the track frame 100 includes a power wheel 112, and the power wheels 112 respectively included in the track units may be referred to as a first power wheel (left) and a second power wheel (right). In addition, the reducer connected to the first power wheel may be referred to as a first reducer, and the reducer connected to the second power wheel may be referred to as a second reducer.

As previously described, the reducer may be configured such that two poles are perpendicular to each other, i.e. the poles are disposed at a right angle (90 degrees) to each other, two poles (which will be referred to as a first pole and a second pole) included in the first reducer are perpendicular to each other, and two poles (which will be referred to as a third pole and a fourth pole) included in the second reducer are perpendicular to each other.

At this time, the first pole of the first reducer may be connected to the first power wheel, and the second pole of the first reducer may be connected to the first hydraulic motor. In addition, the third pole of the second reducer may be connected to the second power wheel, and the fourth pole of the second reducer may be connected to the second hydraulic motor. As a result, as can be seen from (b) of FIG. 3, one first power wheel, one first reducer, and one first hydraulic motor may be located on the left side of the cutting machine, and one second power wheel, one second reducer, and one second hydraulic motor may be located on the right side of the cutting machine.

For reference, the second pole and the fourth pole are parallel to each other. The reason for this is that the two hydraulic motors 120 are connected to the power wheels 112 in a state of being included in the main unit 400 of the cutting machine. As shown in (b) of FIG. 3, each of the hydraulic motors 120 is connected to a corresponding one of the power wheel 112 via a corresponding one of the reducers 130 each bent at an angle of 90 degrees in a state of being included in the main unit 400.

Furthermore, since each of the reducers 130 is bent at a right angle, the main unit 400 including the hydraulic motors 120 may have a small width. That is, miniaturization of the cutting machine may be achieved. When each of the reducers 130 is straight, the width of the main unit 400 may be increased that much.

That is, in the cutting machine according to the present invention, the hydraulic motors 120 and the first and second power wheels 112 may be connected respectively to each other via the reducers 130, and control may be performed through control of the reducers such that the cutting machine can be slowly moved in a straight direction while the hydraulic motors 120 are driven at high speed (or driven at high output) for floor cutting. For example, when the reducer 130 is set to have a reduction ratio of 30:1, the power wheel 112 makes one revolution even though the power motor 120 makes 30 revolutions, and therefore it is possible to precisely control movement of the cutting machine. Under control of a direction adjustment unit 210 according to the present invention, a description of which will follow, the cutting shaft 311 is rotated to set a cutting line. When the cutting shaft 311 is rotated by the direction adjustment unit 210 to set the cutting line and then cutting is performed, power from the hydraulic motors 120 may be reduced through the reducers 130, whereby it is possible for the cutting machine to perform cutting while being slowly moved along the set cutting line with higher accuracy. When the reducers 130 are further provided, therefore, it is possible to further improve cutting performance.

In addition, when the cutting machine performs floor cutting on a ramp, it is possible to easily perform floor cutting on the ramp using the reducers 130. Since each of the hydraulic motors 120 has no braking function, there occurs a problem in that the floor cutting machine moves down the ramp in a ramp direction without operation of the hydraulic motors 120. When the reducers 130 are provided, however, it is possible to (wirelessly) control the cutting machine, whereby it is possible to easily perform work on the ramp and to precisely control floor cutting.

Next, the structure of the track unit 110 will be described with reference to FIG. 4.

Figure 4:
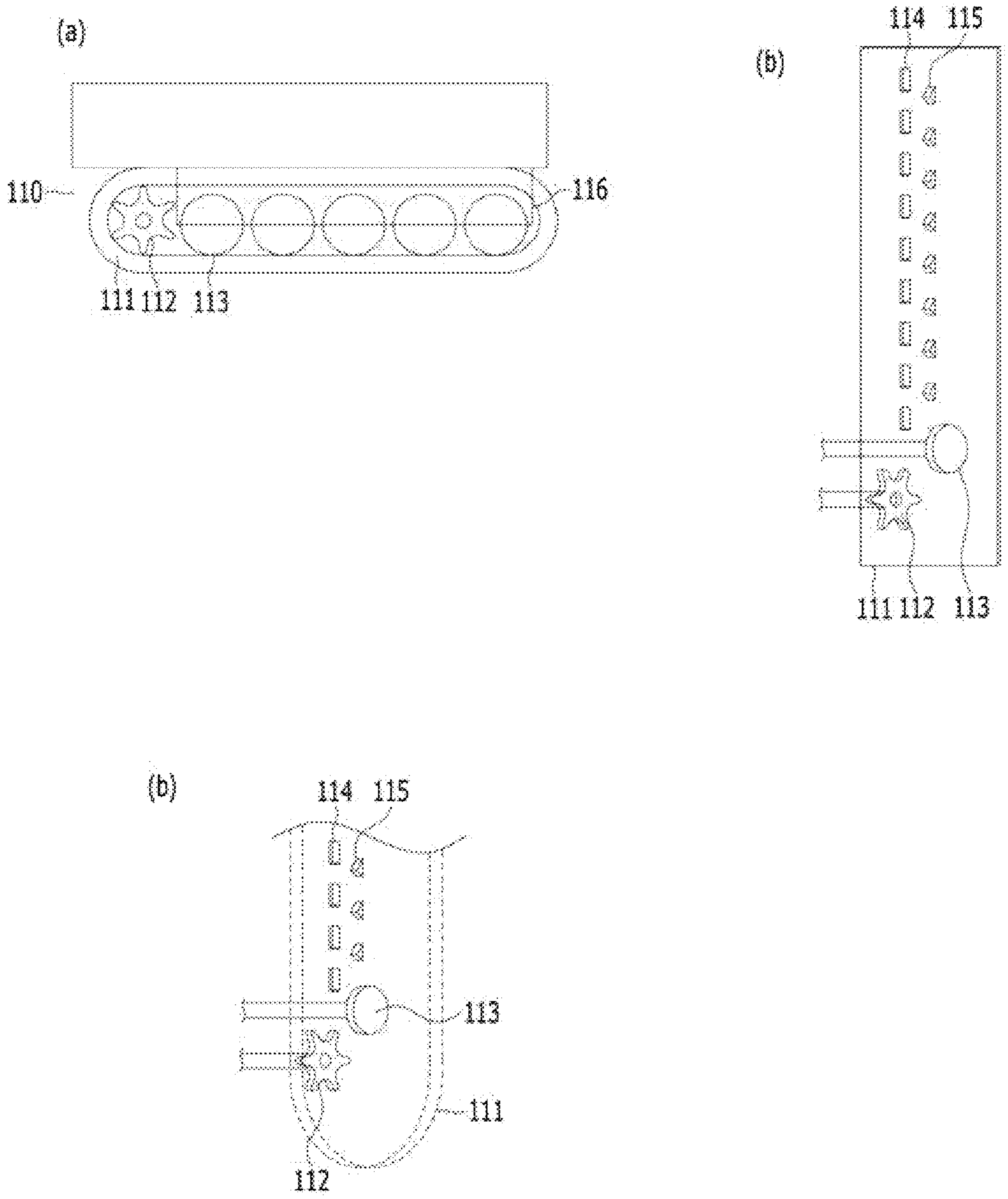
FIG. 4 is a view showing the structure of a track unit according to an embodiment of the present invention.

FIG. 4 is a view showing the structure of a track unit according to an embodiment of the present invention.

The track unit 110 may include a plurality of auxiliary wheels 113, a gear-shaped power wheel 112, and a rail 111 configured to encompass the wheels.

Referring to (a) of FIG. 4, the power wheel 112 is generally located at the rear of the track unit 110, and is configured to have a gear shape. Since the power wheel 112 is connected to the hydraulic motor 120 via the reducer 130, as previously described, the power wheel may move the cutting machine using force received therefrom.

At this time, a plurality of projecting portions provided along the circumference of the gear-shaped power wheel 112 may be referred to as saw-toothed protrusions, and a plurality of cavities provided along the circumference of the gear-shaped power wheel may be referred to as saw-toothed recesses. The power wheel 112 may be rotated by force received from the hydraulic motor 120, whereby the rail 111 may be rotated to move the cutting machine.

Specifically, a plurality of recesses 114 is arranged in the rail 111 in a line. Each of the plurality of recesses may be engaged with a corresponding one of the saw-toothed protrusions of the power wheel 112. As the power wheel 112 is rotated, therefore, the saw-toothed protrusions are inserted into the plurality of recesses 114 one by one to rotate the rail 111.

The auxiliary wheel 113 may be circular, and may have any of other shapes depending on circumstances. A plurality of auxiliary wheels 113 may be provided, and all of the plurality of auxiliary wheels 113 are included in the rail 111. As can be seen from (a) of FIG. 4, a wheel protector 116 configured to protect outer surfaces of the plurality of auxiliary wheels 113 may be attached to an upper end of the track unit 110.

Referring to (b) and (c) of FIG. 4, a plurality of protrusions 115 is arranged in the rail 111 in a line, in the same manner as the plurality of recesses 114. The protrusions 115 protrude inwardly of the rail 111, and each of the protrusions may have any of various shapes, such as a triangle or a quadrangle.

As can be seen from the drawings, the plurality of protrusions 115 may be located in spaces between the power wheel 112 and the auxiliary wheels 113, and may come into contact with pillar parts of the auxiliary wheels 113, respectively, when the rail 111 is actually rotated.

In an embodiment, a separate recess may be provided in the pillar part of each of the auxiliary wheels 113, and the plurality of protrusions 115 may be inserted into the separate recesses one by one. For reference, the recesses 114 and the protrusions 115 are provided at an inner surface of the rail 111, the recesses 114 are arranged in a line at positions close to the inside of the cutting machine, and the protrusions 115 are arranged in a line at positions close to the outside of the cutting machine.

Meanwhile, the cutting machine may further include a manipulation unit, and the manipulation unit may manipulate upward and downward movement of the cutting frame 300.

When an upward movement command for the cutting frame 300 is input through the manipulation unit, the front end of the cutting frame 300 including the cutting blade 310 may be moved upwards.

Specifically, only the front end of the cutting frame 300 may be moved upwards, and a rear end of the cutting frame 300 may be attached and fixed to the cutting machine. That is, only the front end of the cutting frame may be moved upwards and downwards, and the cutting blade 310 may also be moved upwards and downwards therewith.

Hereinafter, the frame structure of the cutting machine will be described in more detail.

As shown in FIG. 2, in the cutting machine, the cutting frame 300, the middle frame 200, and the track frame 100 may be sequentially disposed from above. At this time, a front end of the middle frame 200 may be located lower than a rear end of the middle frame, whereby the middle frame 200 may be inclined at a first predetermined angle.

That is, as shown in FIG. 2, a long pole 101 may support the rear end of the middle frame 200, and a short pole 102 may support the front end of the middle frame 200, whereby the front end of the middle frame 200 may be inclined downwards. For reference, the angle of downward inclination of the middle frame 200 based on a horizontal floor may correspond to the first predetermined angle.

Next, the direction adjustment unit 210 may be provided between the rear end of the cutting frame 300 and the rear end of the middle frame 200. The direction adjustment unit 210 may be configured to rotate the cutting frame 300 or the cutting shaft 301 in a predetermined direction and at a predetermined angle. To this end, the direction adjustment unit 210 may include an upper plate 211 (which may also be called an upper adjustment plate. In the present invention, the upper plate is referred to as an upper adjustment plate, since the upper plate is provided for direction adjustment) and a lower plate 212 (which may also be called a lower adjustment plate. In the present invention, the upper plate is referred to as a lower adjustment plate, since the lower plate is provided for direction adjustment), and may adjust the direction of the cutting shaft 311, as will be described below.

During cutting, the cutting frame 300 may have an angle of downward inclination corresponding to a second predetermined angle based on the horizontal floor due to the height of the direction adjustment unit 210. For reference, the second predetermined angle may be greater than the first predetermined angle.

Figure 5:
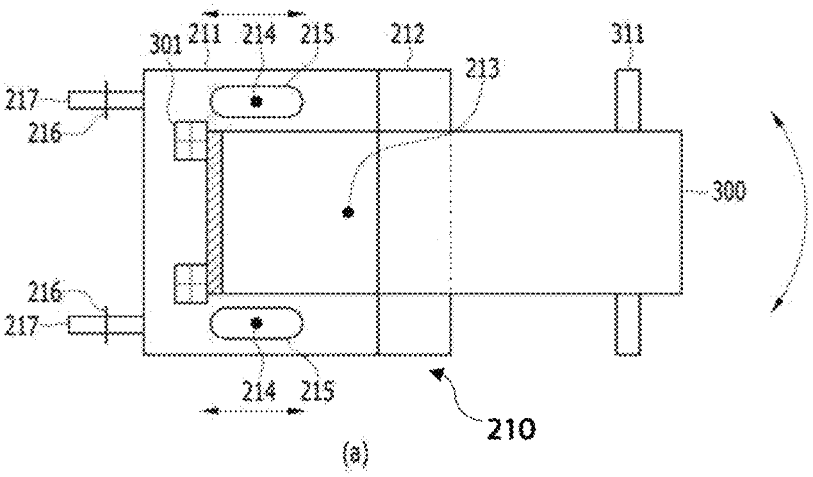
FIG. 5 is a view showing movement of the cutting machine using a signal generator according to an embodiment of the present invention.
Figure 5:
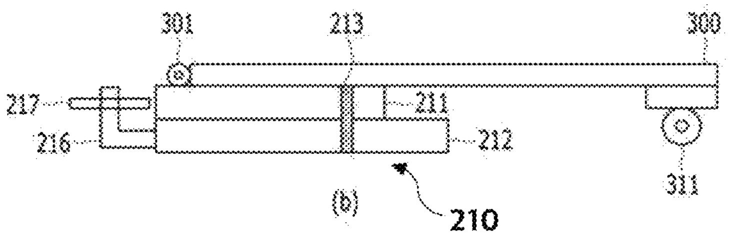
Figure 5:
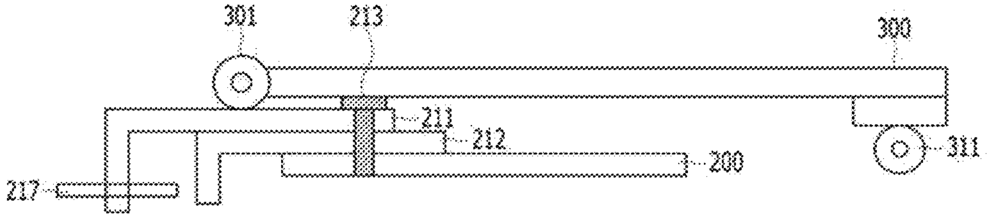

FIG. 5 is a view showing a frame structure according to an embodiment of the present invention.

Specifically, (a) of FIG. 5 shows the cutting machine when viewed from above, (b) of FIG. 5 shows the structure of a cutting frame and a direction adjustment unit according to an embodiment of the present invention when viewed from the side, and (c) of FIG. 5 shows the structure of a cutting frame and a direction adjustment unit according to another embodiment of the present invention different from (b) of FIG. 5 when viewed from the side.

As can be seen from the drawings, the direction adjustment unit 210 includes an upper adjustment plate 211 and a lower adjustment plate 212, fixing fastening portions 214 (as an example, fixing bolts. Hereinafter, the "fixing bolts" will be used for convenience of description) are inserted respectively into opposite side surfaces (e.g. left and right side surfaces) of each of the upper adjustment plate 211 and the lower adjustment plate 212, and a center fastening portion 213 (e.g. a center bolt) is inserted into and fixed to the middle thereof. For reference, the center bolt 213 may also be inserted into the middle frame 200 for fixing. The center fastening portion 213 may be configured to serve as a rotary shaft.

In addition, the lower adjustment plate 212 is fixed to the rear of the middle frame 200, and the upper adjustment plate 211 is fixed to the rear of the cutting frame 300. For reference, joint portions 301 are provided at opposite sides of the rear end of the cutting frame 300, and the joint portions 301 may support upward-downward rotational movement (or vertical movement) of the cutting frame 300. That is, the end of the cutting frame 300 may be rotated upwards and downwards (or moved in a vertical direction) about the joint portions 301. Here, the plurality of joint portions 301 may be supported by the upper adjustment plate 211 and may be fixed to the upper adjustment plate 211 thereon.

Each of insertion holes 215, into which the fixing bolts 214 are respectively inserted, formed in opposite sides of the upper adjustment plate 211 is constituted by a space extending in a longitudinal direction (a forward-rearward direction) by a predetermined length. In contrast, insertion holes (not shown) of the lower adjustment plate 212, into which the fixing bolts 214 are respectively inserted, have the same size as the fixing bolts 214.

When it is necessary to rotate the cutting shaft 311 by a predetermined angle at the time of cutting, the upper adjustment plate 211 may be rotated by the predetermined angle, and then the fixing bolts 214 may be fixed. In the state in which the fixing bolts 214 are fixed, the lower adjustment plate 212 is also fixed, but the upper adjustment plate 211 may be moved along the insertion holes 215 about the fixing bolts in forward and rearward directions, whereby the direction of the upper adjustment plate 211 may be adjusted. Adjustment in direction of the upper adjustment plate 211 will be described below with reference to FIG. 6.

Direction adjustment fastening portions 217 (e.g. adjustment screws; hereinafter, "adjustment screws" will be used for convenience of description) are connected to opposite sides of the rear of the direction adjustment unit 210 (e.g. opposite sides of the rear of the upper adjustment plate 211), and therefore movement of the upper adjustment plate 211 may be controlled by rotating the adjustment screws. For example, when the cutting shaft 311 is located at the right side of the cutting frame 300 or the right side of the front of the cutting frame, one of the direction adjustment fastening portions 217 located at the opposite sides of the rear of the upper adjustment plate 211, e.g. the right adjustment screw, may be adjusted such that the right side of the upper adjustment plate 211 cannot be moved rearwards, and the left adjustment screw may be loosened to move the upper adjustment plate 211 such that the cutting shaft 311 can be moved to the left. When cutting starts after direction adjustment, the left adjustment screw may also be adjusted so as to come into contact with the left side surface of the upper adjustment plate 211. As a result, the direction adjustment unit 21 may be fixed, whereby arbitrary change in direction may be prevented during cutting.

Referring to (b) of FIG. 5, an adjustment screw 217 and an adjustment bar 216 are provided at each of opposite sides of the rear of the direction adjustment unit 210, and the adjustment screw 217 is fitted on the adjustment bar 216. The end of the adjustment screw may contact the upper adjustment plate 211. That is, two adjustment screws 217 are provided at the opposite sides of the rear of the direction adjustment unit 210, and each of the two adjustment screws 217 may be rotated in a clockwise direction or a counterclockwise direction to control movement of the upper adjustment plate 211. For example, when the right adjustment screw 217 is rotated to the end in the clockwise direction and then comes into contact with the upper adjustment plate 211, the right side surface of the upper adjustment plate 211 cannot be moved in the rearward direction due to the right adjustment screw 217.

(c) of FIG. 5 shows an adjustment screw 217 according to another embodiment, wherein the adjustment screws 217 is fitted on an extension portion of the upper adjustment plate 211. That is, as can be seen from (c) of FIG. 5, the rear end of each of the upper adjustment plate 211 and the lower adjustment plate 212 is bent vertically, and the end of the adjustment screw 217 fitted on the upper adjustment plate 211 may contact the rear end of the lower adjustment plate 212.

At this time, the adjustment screw 217 may be rotated in the clockwise direction or the counterclockwise direction to control movement of the upper adjustment plate 211. For example, when the right adjustment screw 217 is rotated to the end in the clockwise direction and then comes into contact with the rear end of the lower adjustment plate 212, the right side surface of the upper adjustment plate 211 cannot be moved in the forward direction.

In the embodiment of (c) of FIG. 5, the adjustment screw 217 is located at a lower side, which is advantageous in terms of space utilization. The reason for this is that many parts are installed at an upper side, at which the cutting frame 300 and the like are located, and therefore the structure may be complicated if the adjustment screw 217 is located at the upper side.

Figure 6:
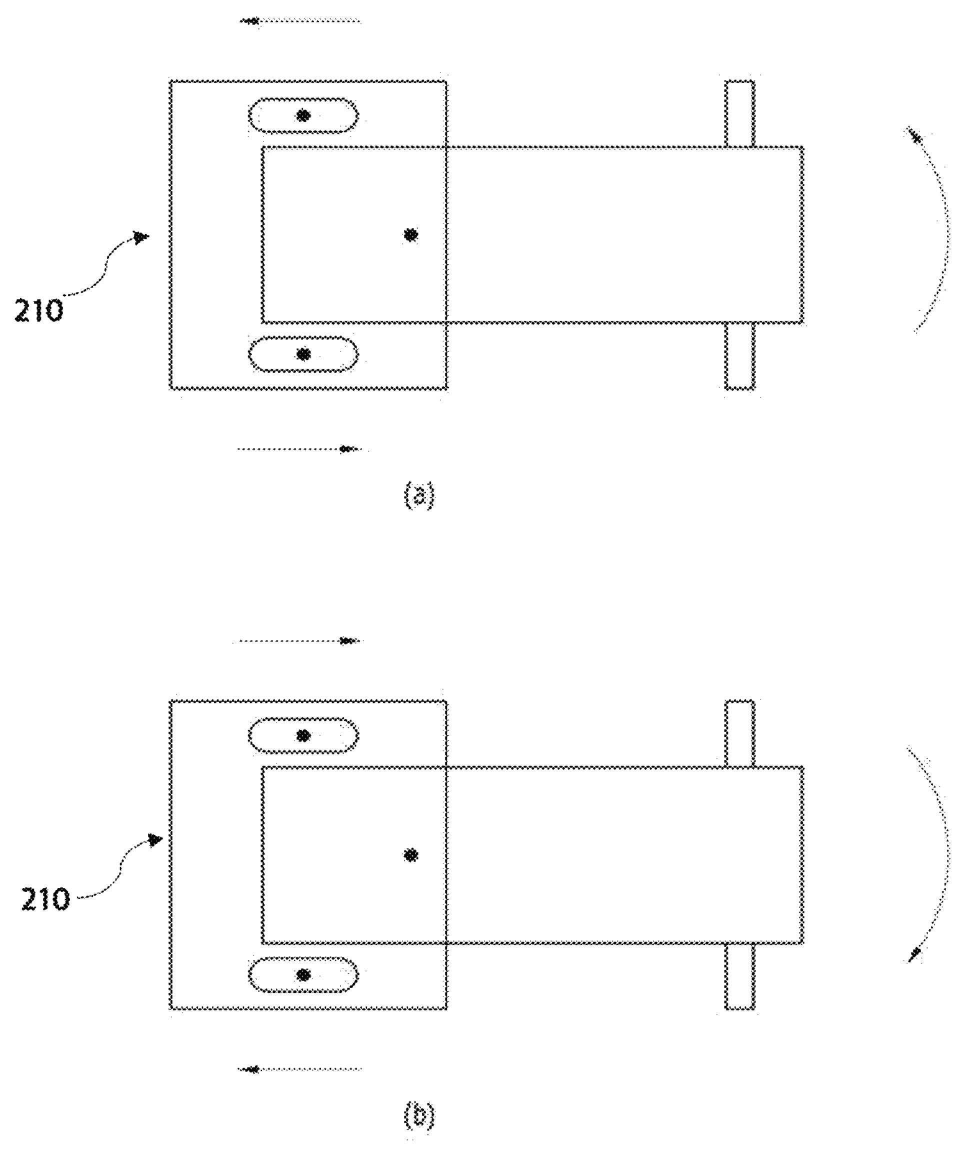
FIG. 6 is a view showing adjustment in direction of an upper plate (an upper adjustment plate) according to an embodiment of the present invention.

FIG. 6 is a view showing adjustment in direction of an upper adjustment plate according to an embodiment of the present invention.

An insertion hole 215 may be provided in each of the left and right side surfaces of the upper adjustment plate 211 of the cutting machine. At this time, the insertion hole 215 located at the left side surface of the upper adjustment plate 211 may be referred to as a first insertion hole, and the insertion hole 215 located at the right side surface of the upper adjustment plate may be referred to as a second insertion hole.

As can be seen from (a) of FIG. 6, when the first insertion hole is moved rearwards and the second insertion hole is moved forwards, the cutting shaft 311 may be rotated in the counterclockwise direction, whereby the cutting frame 300 may be moved in the leftward direction with respect to the front.

As can be seen from (b) of FIG. 6, when the first insertion hole is moved forwards and the second insertion hole is moved rearwards, the cutting shaft 311 may be rotated in the clockwise direction, whereby the cutting frame 300 may be moved in the rightward direction with respect to the front.

That is, the opposite insertion holes 215 of the upper adjustment plate 211 are moved in opposite directions, whereby the (rotational) direction of the cutting shaft 311 may be adjusted. Since the upper adjustment plate 211 is fixed by the center bolt 213, the opposite insertion holes 215 cannot be simultaneously moved in the same direction.

Since the fixing bolts 214 are stationary, the insertion holes 215 may be moved forwards and rearwards around the fixing bolts 214. However, with rotation of the upper adjustment plate 211, the insertion holes 215 do not merely perform linear movement but may be moved to the side (in a diagonal direction). Actually, the movement length (about 1 cm or less) of each of the insertion holes 215 is very small, and the rotational angle of the cutting shaft 311 is less than a predetermined angle.

The rotational direction of the cutting frame 300 may be set based on the position of the (circular) cutting blade 310, and the rotational angle of the cutting frame 320 may be set in consideration of the size (e.g. diameter) of the cutting blade 310. When cutting is performed after the cutting frame 300 is rotated at the set angle and in the set direction and is then fixed, control may be performed such that the cutting machine can be precisely moved along a predetermined cutting line.

Figure 7:
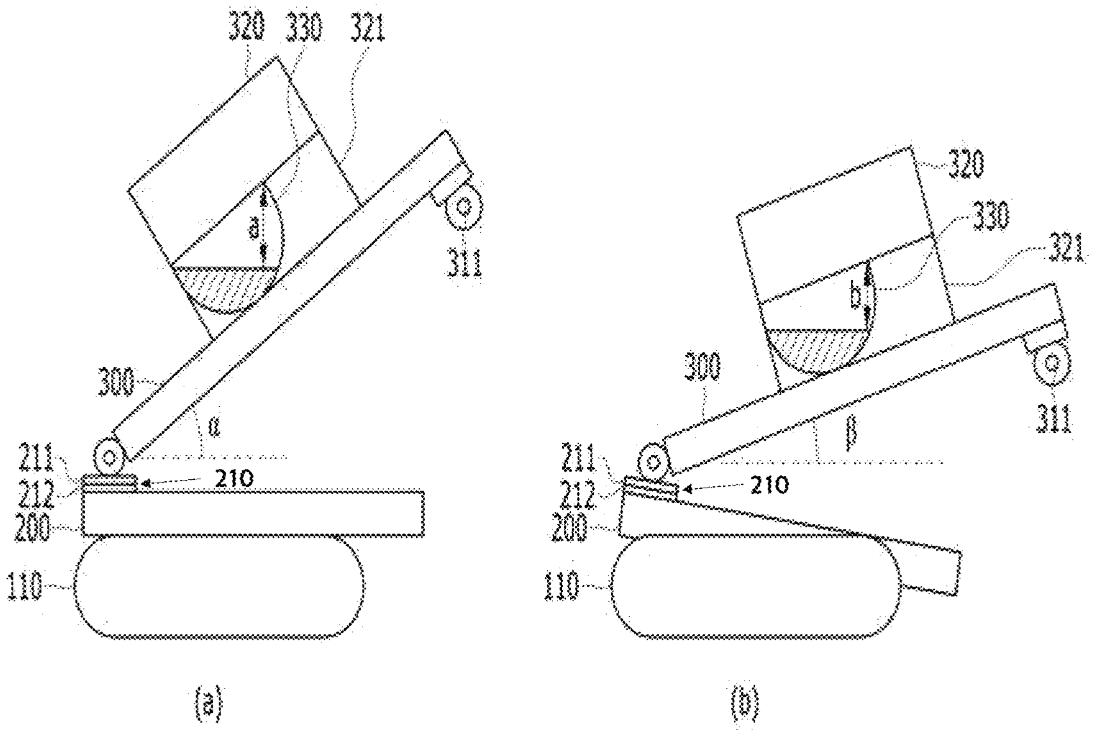
FIG. 7 is a view showing the external shape of a cutting machine including an engine unit and an engine oil unit according to an embodiment of the present invention.

FIG. 7 is a view showing the external shape of a cutting machine including an engine unit and an engine oil unit according to an embodiment of the present invention.

As previously described, the middle frame 200 included in the cutting machine according to the present invention is inclined forwards at a predetermined angle (first predetermined angle), and the cutting frame 300, which is located above the middle frame 200 and the direction adjustment unit 210, is inclined forwards at a larger predetermined angle (second predetermined angle) (during cutting).

An engine unit 320, which is supported by a support bar 321, is installed on the inclined cutting frame 300, and an engine oil unit 330 may be connected to the engine unit 320 in a space under the engine unit 320 at a rear side thereof. For reference, oil is contained in the engine oil unit 330, and the oil is supplied to the engine unit 320 through a hose (not shown). If the oil is not supplied, equipment may break down.

The engine unit 320 and the engine oil unit 330 will be described hereinafter in more detail with reference to FIG. 7.

(a) of FIG. 7 shows the cutting machine in the state in which the middle frame 200 is horizontal, and (b) of FIG. 7 shows the cutting machine (the present invention) in the state in which the middle frame 200 is inclined.

As can be seen from FIG. 7, even though the cutting frame 300 is moved upward by the same height, the cutting frame 300 and the floor (which is assumed to be horizontal) form an angle of $\alpha$ therebetween in (a) of FIG. 7, and the cutting frame 300 and the floor form an angle of $\beta$ therebetween in (b) of FIG. 7. For reference, $\alpha$ may have a larger value than $\beta$.

As a result, angles between the engine unit 320 and the engine oil unit 330, which are located at the upper end of the cutting frame 300, and the floor may also be different from each other, and the oil contained in the engine oil unit 330 may be present in the engine oil unit 330 at different positions.

Even though the same oil is contained, the positions of the oil present in the engine oil unit 330 in (a) and (b) of FIG. 7 may be different from each other. Specifically, in (a) of FIG. 7, in which the angle α of the cutting frame 300 is large, the distance a between the engine unit 320 and the oil in the engine oil unit 330 is long, whereby the supply of oil to the engine unit 320 through the hose may be more difficult. That is, a probability of breakdown of the engine unit 320 may be high.

In contrast, in (b) of FIG. 7, in which the angle β of the cutting frame 300 is small, the distance b between the engine unit 320 and the oil in the engine oil unit 330 is short, whereby the supply of oil to the engine unit 320 through the hose may be easier. That is, a probability of breakdown of the engine unit 320 may be low, whereby safety may be further secured.

Of course, when the amount of oil in the engine oil unit 330 is sufficient, a possibility that the supply of oil to the engine unit 320 becomes difficult is low, whereby a probability of breakdown of the engine unit 320 is also low. If the amount of oil is insufficient, however, safety of the cutting machine may be more secured when the middle frame 200 and the cutting frame 300 are inclined ((b) of FIG. 7) than when the middle frame and the cutting frame are parallel to each other ((a) of FIG. 7). That is, even though the cutting frame 300 is raised upwards from the floor by the same length, a probability of breakdown of the cutting machine of (b) of FIG. 7 is low.

In an embodiment, a measurement sensor (not shown) may be installed in the engine oil unit 330, and when the oil becomes lower than a predetermined height, upward rotational movement of the cutting frame 300 may be prevented. Here, the predetermined height may correspond to the distance by which the hose can extend to the engine unit 320.

Although not shown in FIG. 7, an upward and downward movement adjustment unit configured to move the cutting frame 300 upwards or downwards may be a hydraulic cylinder. The hydraulic cylinder may be fixed to one side of a lower part of the cutting frame 300 by coupling, and may be coupled to a pin installed so as to be connected to a predetermined frame disposed so as to be connected to the middle frame 200 in the form of a tow hook.

The hydraulic cylinder may be configured to have a structure capable of supporting the cutting frame 300 so as to be moved upwards or downwards while the pin and the tow hook form a predetermined angle in a direction opposite the direction in which the upper adjustment plate 211 is rotated when the upper adjustment plate 211 is rotated to the right or the left.

The predetermined angle between the pin and the tow hook in contact with each other may be increased in proportion to the rotational angle of the upper adjustment plate 211, and the contact interface between the pin and the tow hook may be curved, whereby upward and downward movement of the cutting frame 300 may be adjusted by the hydraulic cylinder even though the cutting frame is rotated.

Figure 8:
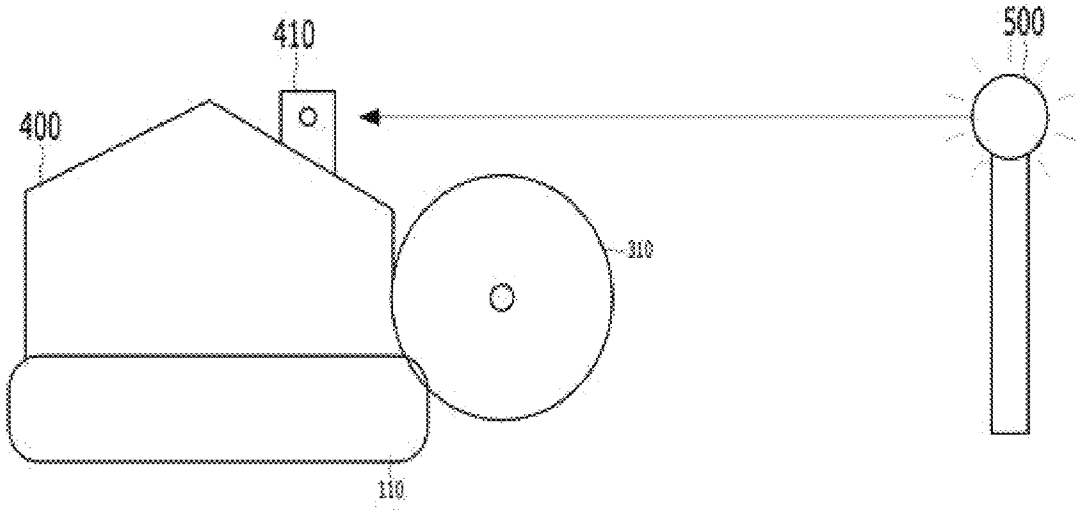
FIG. 8 is a view showing guidance in movement of the cutting machine based on a signal of the signal generator according to the embodiment of the present invention.

FIG. 8 is a view showing guidance in movement of the cutting machine based on a signal of a signal generator according to an embodiment of the present invention.

First, it may be assumed that the signal generator 500 is located in front of the cutting machine. Of course, the signal generator may be located at a position other than the front depending on circumstances. Here, the signal generator 500 may have any of various shapes, such as a bar shape or a circular shape, and may be installed on a pole, etc.

A signal sensor 410 provided at the upper end of the cutting machine may sense a predetermined signal generated by the signal generator 500, and the movement direction of the cutting machine may be set based on the position at which the predetermined signal is generated.

That is, the signal sensor 410 senses a signal generated by the signal generator 500 and transmits the sensed signal to a controller (not shown), and the controller sets the movement direction of the cutting machine based on the position at which the signal is generated.

An autonomous driving system may be applied to the cutting machine such that the cutting machine is automatically movable instead of directly manipulating the movement of the cutting machine. At this time, when the reducer 130 is installed at the cutting machine, the cutting machine may be more accurately moved.

For reference, the predetermined signal generated by the signal generator 500 may correspond to a specific frequency included in a specific range, the signal sensor 410 may sense the specific frequency, and the movement direction of the cutting machine may be set based on the position at which the predetermined signal is generated.

For example, the signal sensor 410 may sense only a specific frequency included in a specific range (100 Hz to 200 Hz), and the signal sensor 410 may not sense other frequencies.

In the embodiment of the present invention, as described above, the cutting line may be changed by the force of friction with the floor generated as the result of rotation of the cutting blade at one side of the cutting frame, but the cutting shaft is appropriately rotated under control of the direction adjustment unit and then cutting is performed, whereby it is possible to perform cutting while the cutting line is accurately maintained, and therefore it is possible to remarkably improve cutting performance.

In addition, the cutting machine according to the embodiment of the present invention further includes the reducer, whereby control is performed such that the cutting line can be precisely maintained, and therefore it is possible to further improve cutting performance.

Embodiments of the cutting machine according to the present invention described above are merely illustrative, and those skilled in the art to which the present invention pertains will understand that the present invention can be easily implemented in other concrete forms without changing the technical concept and essential features of the present invention. Therefore, the embodiments described above should be construed in all aspects as illustrative and not restrictive. For example, single type components may be implemented in a dispersed state, and dispersed components may be implemented in an integrated state.

The scope of the present invention is defined by the appended claims, not the above detailed description, and it should be interpreted that all alterations or modifications derived from the meaning and scope of the claims and equivalent concept thereto be included in the scope of the present invention.

DESCRIPTION OF REFERENCE NUMERALS

100: Track frame
101: Long pole
102: Short pole

110: Track unit
111: Rail
112: Power wheel
113: Auxiliary wheel
114: Recess
115: Protrusion
116: Wheel protector
200: Middle frame
210: Direction adjustment unit
211: Upper adjustment plate
212: Lower adjustment plate
213: Center bolt
214: Fixing bolt
215: Insertion hole
216: Adjustment bar
217: Adjustment screw
300: Cutting frame
301: Joint portion
310: Cutting blade
311: Cutting shaft
400: Main unit
410: Signal sensor
500: Signal generator

INDUSTRIAL APPLICABILITY

A cutting machine having adjustable directions according to the present invention, which is an apparatus having improved cutting performance on a construction site, a structure demolition site, etc., is industrially applicable.

What is claimed is:

1. A cutting machine comprising:

a cutting frame;

a cutting shaft disposed in front of the cutting frame and a cutting blade fitted on the cutting shaft assuming that a direction in which the cutting machine is advanced is a forward direction and a direction opposite thereto is a rearward direction;

a middle frame configured to support the cutting frame, the middle frame located under the cutting frame;

an upper adjustment plate fixed to the rear of the cutting frame a lower adjustment plate fixed to the rear of the middle frame;

a first fixing fastening portion inserted and fixed on a left side surface of the lower adjustment plate and a second fixing fastening portion inserted and fixed on a right side surface of the lower adjustment plate; and a center fastening portion inserted and fixed in the upper adjustment plate and the lower adjustment plate, a first direction adjustment fastening portion connected to a left side of a rear of the upper adjustment plate and a second direction adjustment fastening portion connected to a right side of the rear of the upper adjustment plate;

wherein a front end of the middle frame is located lower than a rear end of the middle frame, whereby the middle frame is inclined at a first predetermined angle, wherein the first fixing fastening portion is inserted into a first insertion hole located at the left side surface of the upper adjustment plate and the second fixing fastening portion is inserted into a second insertion hole located at the right side surface of the upper adjustment plate wherein the first insertion hole is constituted by a first space extending in a longitudinal direction by a predetermined length so that the first insertion hole of the upper adjustment plate moves forwards and rearwards around the first fixing fastening portion to control a direction of the upper adjustment plate, wherein the second insertion hole is constituted by a second space extending in the longitudinal direction by the predetermined length so that the second insertion hole of the upper adjustment plate move forwards and rearwards around the second fixing fastening portion to control a direction of the upper adjustment plate, wherein while the first and second fixing fastening portions are fixed, the lower adjustment plate is fixed, but the upper adjustment plate can be moved along the first insertion hole about the first fixing fastening portion in forward and rearward directions, wherein the first direction adjustment fastening portion comprises a first adjustment screw and a first adjustment bar, and the second direction adjustment fastening portion comprises a second adjustment screw and a second adjustment bar, wherein the first adjustment screw is fitted on the first adjustment bar and an end of the first adjustment screw is configured to contact the upper adjustment plate, the second adjustment screw is fitted on the second adjustment bar and an end of the second adjustment screw is configured to contact the upper adjustment plate, wherein, for direction adjustment, the second adjustment screw is adjustable so that the right side of the upper adjustment plate cannot move rearward, while the first adjustment screw is adjustable to a loosened state so that the upper adjustment plate and the cutting shaft can rotate left, and wherein the cutting blade is configured to cut a cutting line according to the rotation of the cutting shaft.

2. The cutting machine according to claim 1, wherein the rear of the cutting frame is fixed, and the cutting frame is configured to move up and down a front to which the cutting blade is attached.

3. The cutting machine according to claim 1, wherein, for direction adjustment, the first adjustment screw is adjustable so that the left side of the upper adjustment plate cannot move rearward, while the second adjustment screw is adjustable to a loosened state so that the upper adjustment plate and the cutting shaft can rotate right, and wherein the cutting blade is configured to cut a new cutting line according to the rotation of the cutting shaft.

4. The cutting machine according to claim 1, wherein after the direction adjustment is completed, the first adjustment screw is configured to contact the left side of the upper adjustment plate to fix the direction adjustment portion.

5. The cutting machine according to claim 1, further comprising an engine unit and an engine oil unit installed on the cutting frame, and wherein the engine oil unit is connected to the engine unit in a space under the engine unit at a rear side thereof.

6. The cutting machine according to claim 1, further comprising:

a first power motor disposed at one side of the cutting machine, a first power wheel configured to be driven by the first power motor, and a first reducer configured to connect the first power motor and the first power wheel to each other therebetween; and a second power motor disposed at the other side of the cutting machine, a second power wheel configured to be driven by the second power motor, and a second reducer configured to connect the second power motor and the second power wheel to each other therebetween, wherein the first reducer and the second reducer are provided such that the cutting shaft can be moved forwards while maintaining a set direction during cutting.

* * * * *